US00RE43210E

(19) United States
(12) Reissued Patent
Hong et al.

(10) Patent Number: US RE43,210 E
(45) Date of Reissued Patent: Feb. 21, 2012

(54) WIRELESS RECEIVER FOR RECEIVING MULTI-CONTENTS FILE AND METHOD FOR OUTPUTTING DATA USING THE SAME

(75) Inventors: Ji-Hoon Hong, Seoul (KR); Byung-Ho Lee, Seoul (KR); Chun-Yong Oh, Seoul (KR)

(73) Assignee: iCUBE, Seoul (KR)

(21) Appl. No.: 13/085,247

(22) Filed: Apr. 12, 2011

Related U.S. Patent Documents

Reissue of:
(64) Patent No.: 7,519,686
Issued: Apr. 14, 2009
Appl. No.: 10/448,054
Filed: May 30, 2003

(30) Foreign Application Priority Data

May 30, 2002 (KR) ..... 10-2002-0030419

(51) Int. Cl.
*G06F 13/00* (2006.01)

(52) U.S. Cl. ..... 709/219; 709/231; 709/250; 719/328

(58) Field of Classification Search ..... 709/217, 709/219, 230, 231; 719/328, 329
See application file for complete search history.

(56) References Cited

U.S. PATENT DOCUMENTS 5,907,323 A 5/1999 Lawler et al.
6,040,829 A 3/2000 Croy et al.
6,463,304 B2 * 10/2002 Smethers ..... 455/566
6,529,233 B1 3/2003 Allen
7,082,459 B2 7/2006 Kim et al.
7,182,459 B1 2/2007 Chen
2002/0069415 A1 6/2002 Humbard et al.
2003/0025735 A1 2/2003 Polgar et al.
2003/0028811 A1 * 2/2003 Walker et al. ..... 713/202
2003/0030720 A1 2/2003 Hutchings
2003/0202006 A1 10/2003 Callway
2004/0244042 A1 12/2004 Billmaier

* cited by examiner

*Primary Examiner* — Viet Vu
(74) *Attorney, Agent, or Firm* — H.C. Park & Associates, PLC

(57) ABSTRACT

A wireless receiver for receiving a multi-contents file and a method for outputting data using the same, which can receive, navigation information for providing intuitively recognizable search interfaces to a user by radio in real time, receive various types of contents files by radio in real time, and output the received information and files through an AV device. A video decoder decodes a video stream on the basis of an MPEG standard. An audio decoder decodes an audio contents file. An OSD processor processes a text file and additional information. A video output unit selectively configures decoded video data and text data on one screen and performs encoding and outputting operations based on the format of a display unit. An audio output unit outputs decoded audio data. A user interface receives a user's command. A WLAN card communicates WLAN data with a computer system. A controller requests the computer system to transmit navigation screen information, at least one contents file or additional information of the contents file edited and processed by the computer system, analyzes a data stream received by radio from the computer system responsive to the request, and performs a control operation so that a result of the analysis is inputted into the decoder or OSD processor. A memory stores the stream and control program data.

10 Claims, 14 Drawing Sheets

WIRELESS RECEIVER FOR RECEIVING MULTI-CONTENTS FILE AND METHOD FOR OUTPUTTING DATA USING THE SAME

Matter enclosed in heavy brackets [ ] appears in the original patent but forms no part of this reissue specification; matter printed in italics indicates the additions made by reissue.

CROSS REFERENCE

This application claims the benefit of Korean Patent Application No. 2002-030419, filed on May 30, 2002, which is hereby incorporated by reference for all purposes as if fully set forth herein.

BACKGROUND OF THE INVENTION

1. Field of the Invention

The present invention relates to a system for receiving multiple contents, and more particularly to a wireless receiver for receiving a multi-contents file and a method for outputting data using the same, which can receive navigation information for providing a much improved search interface and various types of contents files by radio in real time, and output the received information and files through an audio/visual (AV) device.

2. Description of the Related Art

Personal computers (PCs) have been widely used and most of households now have at least one computer. People get various information via the Internet using a PC at home. The user of the PC receives various contents files, such as audio contents files (MP3, WAV, etc.), video contents files (AVI, MPEG, WMV, etc.), image contents files (JPEG, TIFF, BMP, etc.), text contents files (txt, doc, etc.), etc. and stores them in the PC.

A multimedia system connected to the PC and an audio/visual (AV) system now provides high-quality images and high-quality audio. However, it is not easy for one AV system to reproduce all the contents files downloaded to the PC and stored in various media. For example, image sizes, compression bit rates, frame rates, and other specifications of DivX, MPEG4 and MPEG2 files stored in the PC are all different. A conventional AV system such as high-definition television cannot reproduce various types of contents files without each and every suitable decoder for each type of contents files.

Thus, a system or a method that a server receives various types of contents files and outputs the received files in a format that can be decoded by the AV system would increase the utility of the multimedia system connectable to the PC.

A conventional set-top box (STB) that can be connected to the PC or others provides only file names of the various contents files stored in the PC. In other words, when searching for the various types of contents files stored in the PC, the user can only refer to the file names. Thus, users have difficulties in finding an appropriate file.

Further, the conventional STB supports only a 256-color mode for on-screen display (OSD) rather than a true-color mode, which is another problem of low quality image.

SUMMARY OF THE INVENTION

Therefore, the present invention addresses the above described problems. The present invention provides a wireless receiver that receives a multi-contents file and a method for outputting such information. The wireless receiver can receive, by radio, the navigation information and various types of contents files edited and processed by the PC in real time and output such information and contents files to a user, which can help the user recognize each of the contents files intuitively.

The present invention can also allow the user to send a command to a wireless receiver, which in turn transmits the command to a contents file provider. The contents file provider then converts the stored contents files into a format that can be reproduced by contents files provided in real time from the server into signals that can be outputted by an audio/visual (AV) system, and transmits them to the wireless receiver.

BRIEF DESCRIPTION OF THE DRAWINGS

The above and other objects, features and other advantages of the present invention will be more clearly understood from the following detailed description taken in conjunction with the accompanying drawings.

DESCRIPTION OF THE PREFERRED EMBODIMENTS

Now, embodiments of the present invention will be described in detail with reference to the drawings.

Figure 1:
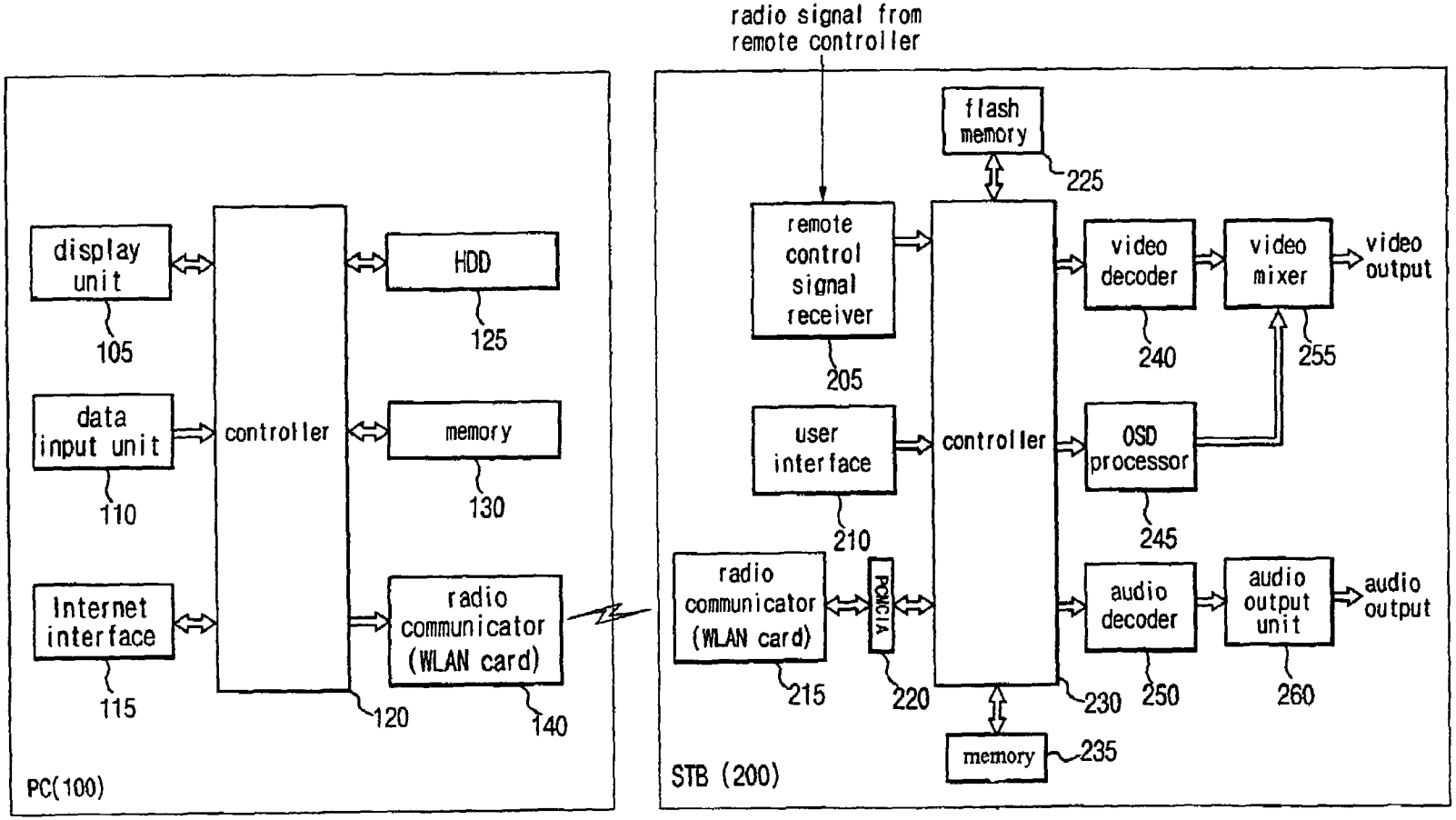
FIG. 1 is a block diagram illustrating a wireless receiver 200 for receiving a multi-contents file by radio from a personal computer (PC) 100 in real time in accordance with an embodiment of the present invention.

FIG. 1 is a block diagram illustrating a wireless set-top box (STB) 200 being a wireless receiver for receiving a multi-contents file by radio from a personal computer (PC) 100 in real time in accordance with an embodiment of the present invention. The PC 100 and the STB 200 make a system for reproducing multiple types of contents along with an audio/visual (AV) system such as a high-definition television. Typically, the AV system connected to the wireless receiver such as the STB 200 is used for externally displaying or outputting video, audio, text and image contents files.

The PC 100 transmits the navigation information and the contents files by radio. The STB 200 receives the navigation information and contents files transmitted by radio from the PC 100 and outputs the information and contents files to the AV system. The configuration and mechanism will be described in more detail.

Referring to FIG. 1, a display unit 105 being a display unit (e.g., a monitor or liquid crystal display (LCD)) of a conventional PC, outputs various display data processed by a controller 120. A data input unit 110 is used for inputting additional information of contents files, and is provided as a user interface being a keyboard or mouse. The content files described in the present invention include audio contents files (MP3, WAV, etc.), video contents files (AVI, MPEG, WMV, etc.), image contents files (JPEG, TIFF, BMP, etc.), text contents files (txt, doc, etc.) such as e-books, etc. The additional information of the contents files may vary depending on the types of the contents files. However, most of the additional information includes a representative image corresponding to each contents file, and annotation information describing each contents file.

Internet interface 115 interfaces data transmitted and received between an external network and the PC 100. It can be a network connection unit such as a modem.

The controller 120 controls an entire operation of the PC 100 based on the control program data stored in memory 130. For example, the controller 120 synthesizes representative images of respective titles that user selected on a background screen in order to configure a navigation screen. It converts the navigation screen in an MPEG2 I-frame format, stores the converted navigation screen and generates a meta data file containing access information for accessing at least one contents file of each title associated with the navigation screen, its additional information, etc. Further, the controller 120 uses a web browser to connect the PC 100 to a server (being a CD database (CDDB)) with a uniform resource locator (URL), of which address is programmed previously. Thus, desired additional information can be provided to a user. Moreover, receiving a request for a contents file from the STB 200 through the radio communicator 140, the controller 120 searches the corresponding file and transmitted it through the radio communicator 140. In the present application, a title refers to a title of each contents file defined by the user.

Memory 130 stores not only application program data but also various control program data for controlling the computer system. Further, memory 130 stores a plurality of independent background screen data configuring the navigation screen in accordance with the present invention. The "background screen" can be optionally used for implementing the present invention, and can be defined as a screen consisting of a background of the navigation screen. In other words, the navigation screen can be configured by the background screen and representative images overlapped on the background screen in accordance with an embodiment of the present invention. The background screen can use an image, designated by the user, stored in a hard disk drive (HDD) 125.

The HDD 125 stores various contents files selected by the user, and a predetermined area of the HDD 125 is classified as a database by the control of the controller 120, and is used for registering additional information corresponding to each title.

A radio communicator (a wireless local area network (WLAN) card) 140 communicates data with another radio communicator 215 provided in the STB 200. The radio communicator 140 transmits a data access command received from the STB 200 to the controller 120, converts a contents file or additional information, navigation screen information, etc. accessed by the controller 120 according to a WLAN communication protocol, and transmits the converted file or information to the STB 200.

Transmission of information between the STB 200 and the PC 100 will be described in more detail.

First, the STB 200 as the example of the wireless receiver in accordance with the present invention is equipped with a remote control signal receiver 205. The remote control signal receiver 205 receives and decodes a radio signal sent from a remote controller by the user, and the decoded signal is sent to the controller 230. Another user interface 210 is a manipulation panel arranged on a front surface of the STB 200. The user interface 210 includes a plurality of buttons and indicator lamps. The user interface 210 sends the controller 230 a signal generated by user's manipulation of the buttons. The radio communicator 215 transmits various access request signals from the controller 230 to the PC 100 through a personal computer memory card international association (PCMCIA) card 220, and transmits stream information, etc. sent from the PC 100 to the controller 230. The radio communicator 215 communicates data with the radio communicator 140 of the PC 100 using a wireless telecommunication protocol. One example of such a protocol is IEEE 802.11 protocol.

A flash memory 225 stores control program for controlling the STB 200. The controller 230 controls an access to the flash memory 225. Memory 235 could be a synchronous dynamic random access memory (SDRAM) or other memory devices and temporarily stores data generated by a control operation of the STB 200, and stores various stream information, e.g., the navigation information, contents file, additional information, etc., transmitted from the PC 100. The flash memory 225 could be replaced with any type of non-volatile memory devices.

The controller 230 controls an entire operation of the STB 200 in response to the user's command inputted from the remote control signal receiver 205 or the user interface 210, and controls a system such that the stream information from the PC 100 is analyzed and the analyzed stream information is transmitted to a video decoder 240, an on-screen display (OSD) processor 245 or an audio decoder 250.

The video decoder 240 decodes a video contents file, navigation screen information and MPEG2 I-frame data, and outputs the decoded file, information and data. The video decoder 240 can be an MPEG decoder.

The OSD processor 245 processes additional information such as input characters under the control of the controller 230, and outputs the processed information to a video mixer 255. The video mixer 255 mixes video information decoded by the video decoder 240 and the additional information processed by the OSD processor 245 such that the mixed video information and additional information can be displayed on a single screen. A video signal outputted from the video mixer 255 is encoded into a composite video signal based on a national television system committee (NTSC) or phase alternation by line (PAL) system through a video encoder (not shown), and the encoded video signal is applied to the AV system. In accordance with the present invention, a group of the video mixer 255 and the video encoder is defined as a video output unit.

The audio decoder 250 decodes and outputs an audio contents file (e.g., an MP3 file) provided by the controller 230, and an audio output unit 260 converts decoded audio data into analog data to apply the analog data to the AV system.

The contents file and navigation screen information is edited by the PC 100 and the STB 200 receives the edited contents file and navigation screen information by radio and outputs the edited contents file and navigation screen information to the AV system. The detailed mechanism and operation will be described now.

Figure 2:
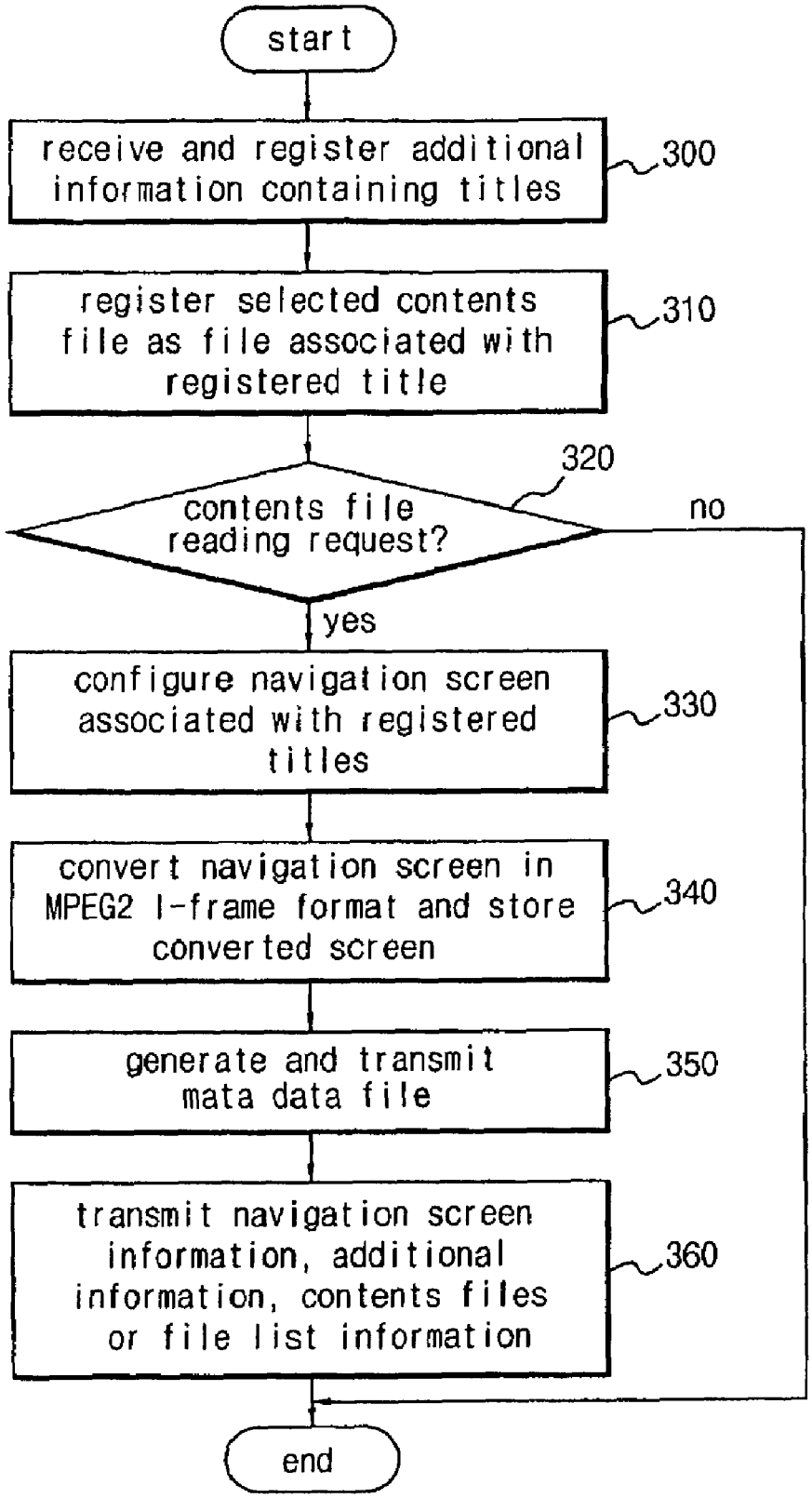
FIG. 2 is a flowchart illustrating a method for editing the contents file in the PC 100 in accordance with an embodiment of the present invention.

FIG. 2 is a flowchart illustrating a method for editing the contents file in the PC 100 in accordance with an embodiment of the present invention.

Referring to FIG. 2, a plurality of contents files to be edited are stored in the HDD 125 of the PC 100 such that the present invention can be implemented. For example, the above-described contents files include a video contents file (DivX, MPEG, etc.), audio contents file, text contents file and image contents file. When the contents files are downloaded from the Internet, the downloaded contents files can be stored in the HDD 125. Optionally, when the contents files are read or extracted from a recording medium such as a compact disc (CD), the extracted contents files can be stored in the HDD 125.

When the plurality of contents files are stored in the HDD 125, the user uses an application program to edit the contents files. Using an editing screen as shown in FIG. 4, the user can edit representative thumbnail images and additional information associated with an audio contents file, a video contents file, a contents file of images such as photos, and a text contents file.

Figure 4:
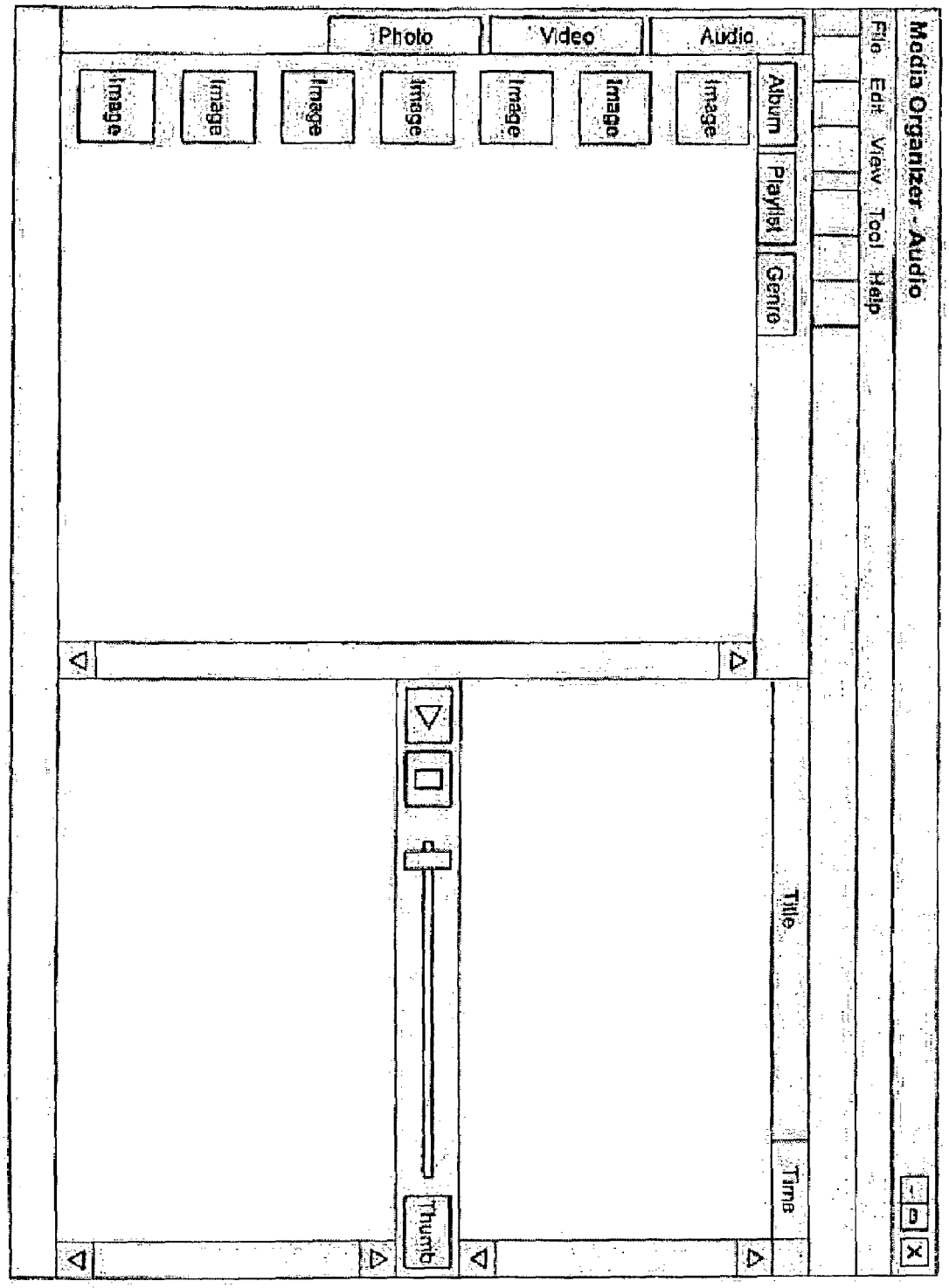
FIGS. 4, 5 and 6 are views illustrating an initial screen and an editing screen displayed at a time of editing the contents file in the PC 100 in accordance with an embodiment of the present invention.
Figure 5:
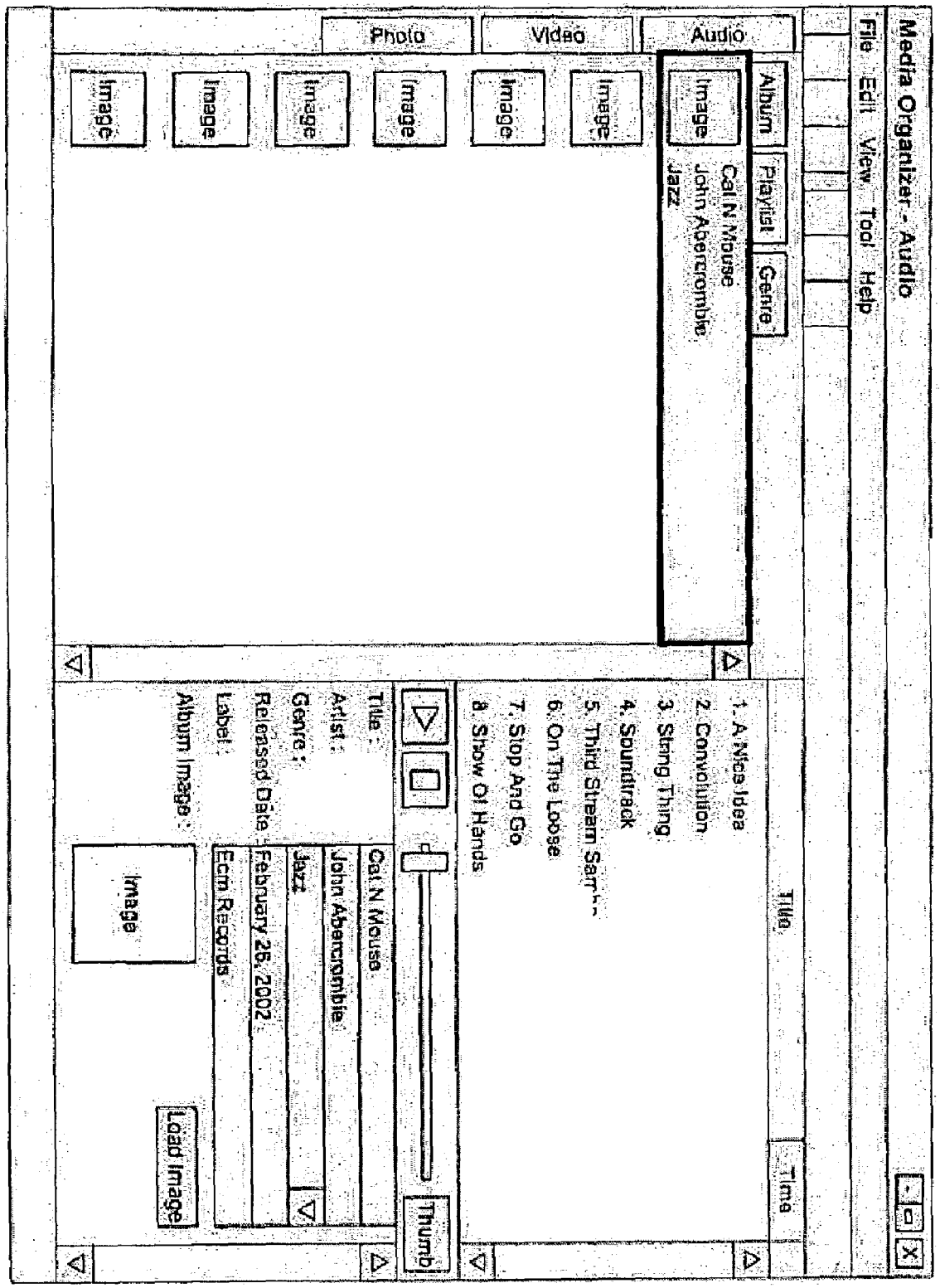

After selecting an audio, video or photo editing item at editing screen as shown in FIG. 4, the user inputs, through corresponding input windows, additional information containing a title and a representative image corresponding to the title. If so, the controller 120 receives the additional information containing a title and the representative image corresponding to the title, and registers the additional information at the database stored in the HDD 125, at step 300. The database can be configured in any storage devices anywhere else. FIG. 5 shows an editing screen, where the audio editing item is selected. The audio editing screen has categories of an album, a playlist and a genre. When the album category is selected, the user can input the additional information such as an album title (e.g., Cat N Mouse), an artist name, a genre, a release date, a label, etc. into input windows displayed on a lower portion of a right side in the screen. Further, the user can add a representative image as one of additional information items through which the user can intuitively recognize the album title using the STB 200 as a receiving end. The representative image can be added by a drag and drop operation for a corresponding image file contained in the image file list after reading the image file list stored in the HDD 125.

As described above, completing the input of additional information containing a title of a contents file and a representative image and annotation information corresponding to the title, the user selects a desired contents file from among contents files stored in the HDD 125. At step 310, the selected file is registered as a contents file associated with the title registered at the above step 300. As shown in the editing screen of FIG. 5, a file list registered in names of specified titles is displayed to the user. For reference, only position information of files configuring the file list is organized in the database so that a corresponding file can be accessed later on.

In this way, the user can assign a title to a video contents file, an audio contents file, a text contents file, an image contents file or a group of files. The representative image and annotation information corresponding to each title can be additionally registered in the database. For example, a well-known album function can be assigned to an audio contents file and a photo contents file. In other words, the additional information containing a title and a representative image corresponding to the title can be added to one video contents file, and the video contents file can be registered in the database. Moreover, the audio and photo contents files have album titles, and a representative image and annotation information corresponding to the album title can be registered as additional information. The representative image and annotation information corresponding to each audio or photo contents file belonging to an album can be added to the additional information. Here, the representative image enables the user to intuitively recognize the album title.

Figure 6:
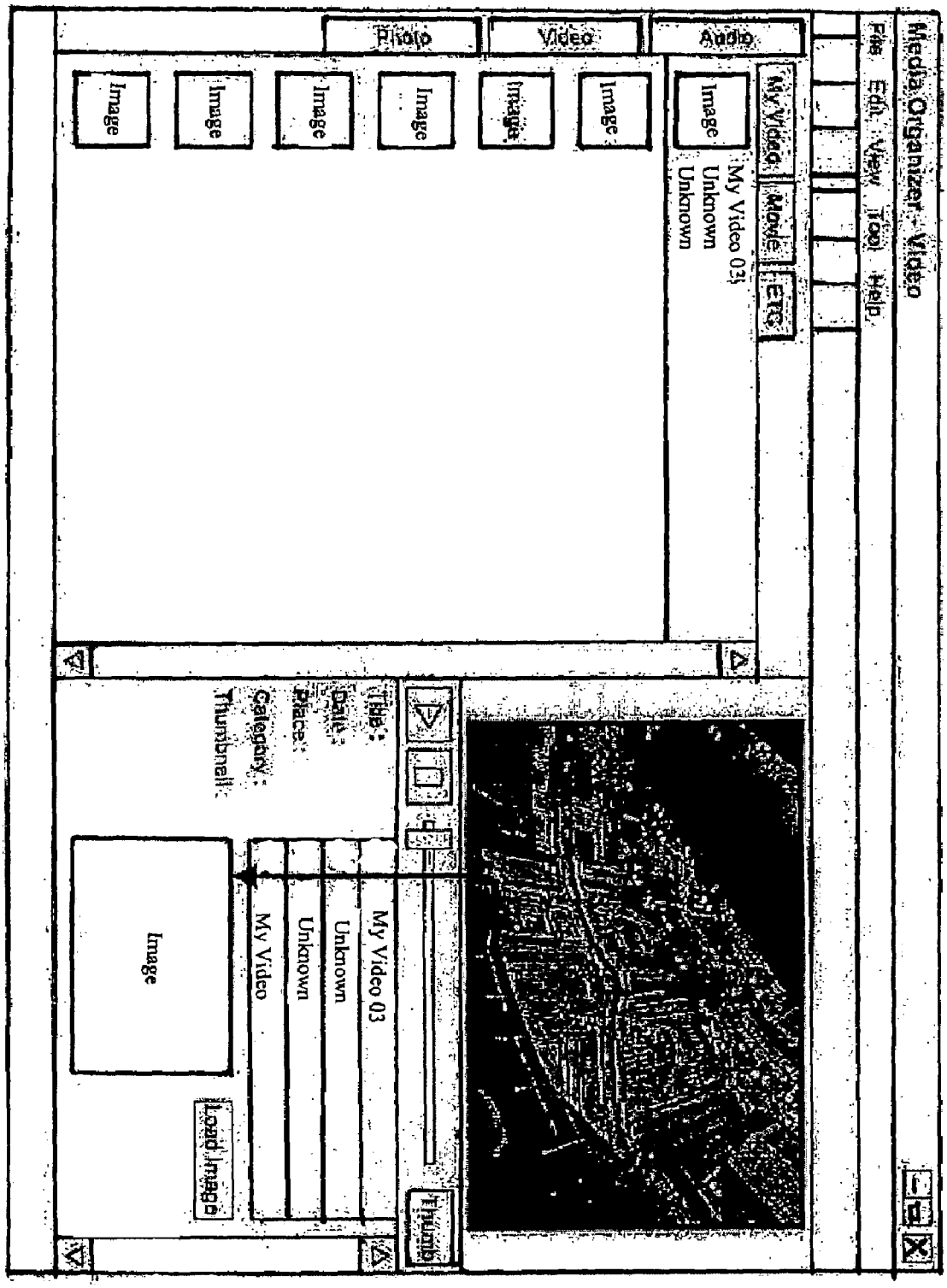

FIG. 6 shows an exemplary video-editing screen based on the user's selection. As an example, the video-editing screen includes the categories of "My video", "Movie" and "ETC". The user can add another category to the video-editing screen. FIG. 6 shows an exemplary video-editing screen showing one still picture accessed by the user's search or selection.

Once completing the editing, contents files and additional information containing titles and representative images corresponding to the titles are stored in the HDD 125. In this state, the user makes an edited-contents file reading request through a remote controller and the request is transmitted to the radio communicator 140 of the PC 100 through the radio communicator 215 of the STB 200. Thus, the controller 120 can detect the contents file reading request through the radio communicator 140.

Upon receiving the contents file reading request at step 320, the controller 120 configures, on a navigation screen, representative images corresponding to titles registered in the database at step 330. At step 340, the controller 120 converts the representative images in an MPEG2 I-frame format, and stores the converted representative images. The controller 120 converts the representative images, because an MPEG2 decoder in the STB 200, which is mostly used at present time, can decode the representative images formatted in the MPEG2 I-frame. The representative images are synthesized with a stored background screen based on a batch message program (BMP) format to create the navigation screen. Of course, one navigation screen can be optionally created by only representative images without the background screen. The number of representative images capable of being synthesized on the navigation screen can be limited. Thus, if the number of titles registered by the user exceeds the number of representative images that can be drawn on the navigation screen, a plurality of navigation screens can be configured. A subsequent navigation screen can be accessed in response to a subsequent navigation screen request from the STB 200.

The controller 120 generates a meta data file needed for subsequently providing information selected from the navigation screen displayed through the STB 200 by the user. Then the controller 120 transmits the meta data file to the STB 200 through the radio communicator 140 along with the stored navigation screen at step 350. For reference, the meta data file to be transmitted in real time can be configured by only identity (ID) information of the representative images contained in the navigation screen. That is, if the user selects an arbitrary representative image configuring the navigation screen, an ID corresponding to the selected representative image is fed back to the controller 120. Then, the controller 120 accesses a contents file, stored in the HDD 125, corresponding to the fed back ID, and transmits the accessed contents file. If additional information of an arbitrary representative image is requested to access, an additional information access request tag is attached to the ID of a corresponding representative image and the ID is fed back to the controller 120, such that the controller 120 can get such additional information of the corresponding representative image stored in the HDD 125, and transmit the accessed additional information. Of course, where another navigation screen subsequent to an arbitrary navigation screen is accessed, the access can be implemented through a feedback of ID information. The controller 120 can access and transmit a subsequent contents file or subsequent additional information without generating and transmitting the meta data file used for a real-time transmission. At this time, a position coordinate value associated with the user's selection on the navigation screen can be used. That is, if an OSD layer screen is configured to display along with a representative image a shift button for shifting a display screen from one navigation screen to a subsequent navigation screen, an additional information open button, etc. can be displayed. Also, a coordinate value on the screen selected by the user is fed back to the controller 120. Then, the controller 120 accesses the information corresponding to the fed back coordinate value and transmits such information.

As described above, upon receiving feedback information for accessing subsequent information from the STB 200 after completely transmitting the meta data file along with the navigation screen, the controller 120 accesses subsequent navigation screen information, additional information corresponding to each title, a contents file associated with each title configuring the navigation screen, or file list information of respective titles stored in the HDD 125, and transmits the accessed information or file to the STB 200 at step 360. In this case, a contents file of images such as photos is converted into an MPEG2 I-frame format and the converted contents file is transmitted so that the STB 200 can decode the image contents file. Similarly, a video contents file also must be converted to a file format that can be decoded by the STB 200 and such file must be transmitted so that the video decoder in the STB 200 can reproduce the video contents file. Of course, it is obvious that an audio contents file also must be converted into a predetermined file so that the audio decoder 250 provided in the STB 200 can decode the file and the file must be transmitted. One of the file formats that can be used is an MPEG format.

Details of the meta data file are extensively described in a co-pending U.S. Patent Application titled "Method for editing and processing contents file and navigation information", filed May 27, 2003, assigned to the same assignee of the present application, which is hereby incorporated by reference.

How the STB 200 uses contents files edited and processed by the PC 100, and navigation information for searching for the edited and processed contents files, will be described.

Figure 3:
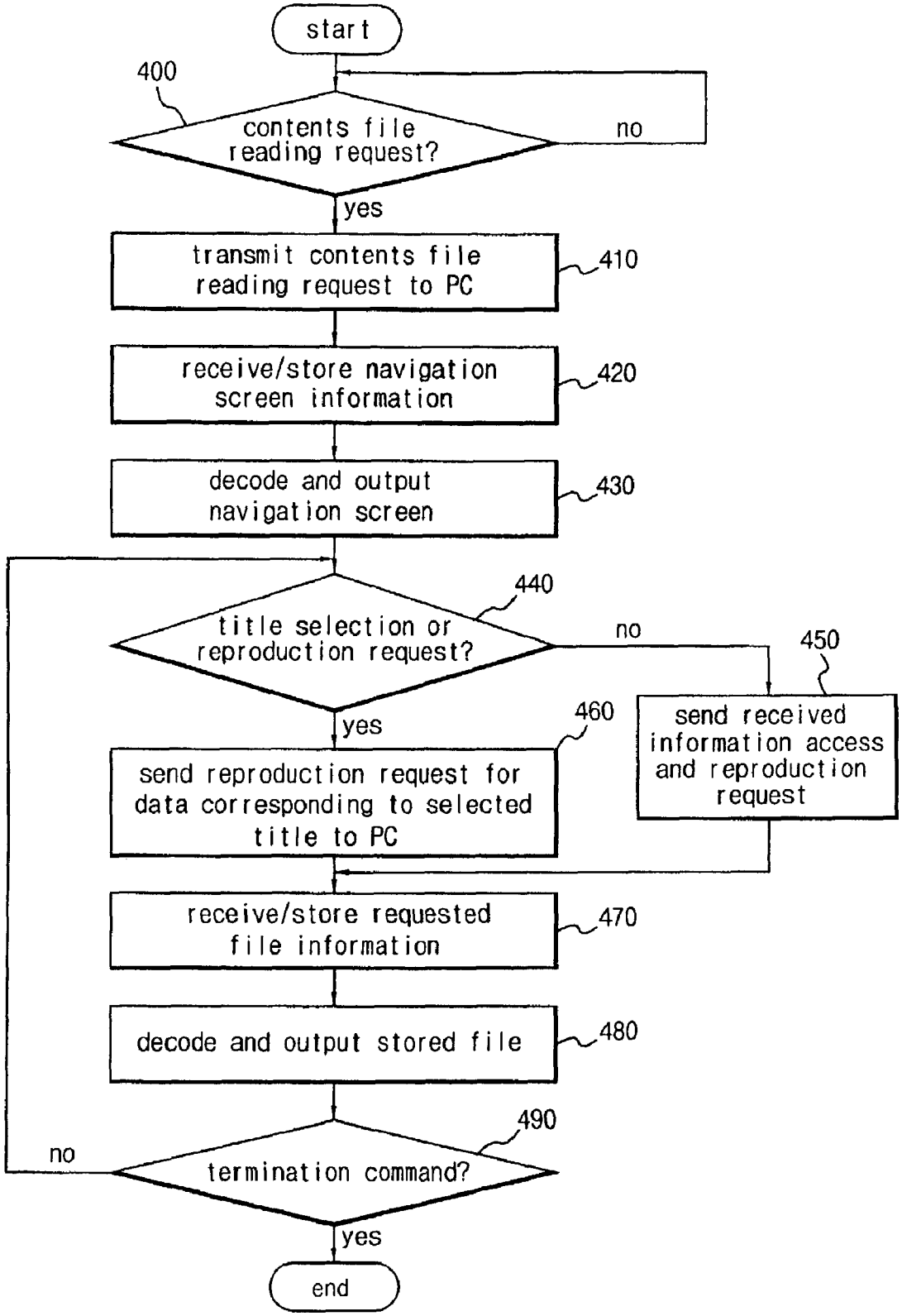
FIG. 3 is a flowchart illustrating an operation of the wireless receiver 200 receiving the multi-contents file in accordance with an embodiment of the present invention.

FIG. 3 shows a flowchart illustrating an operation of the STB 200 receiving the multi-contents file in real time in accordance with an embodiment of the present invention.

Referring to FIG. 3, the controller 230 of the STB 200 determines whether an edited-contents file is requested, at step 400. If the edited-contents file reading is requested, the controller 230 transmits the contents file reading request to the PC 100 through the radio communicator 215 at step 410. As shown in FIG. 2, the PC 100 transmits navigation screen information by radio. The STB 200 receives the navigation screen information through the radio communicator 215, and the received navigation screen information is first stored in a memory 235 by the controller 230 at step 420.

At step 430, the controller 230 accesses the stored navigation screen information, and the video decoder 240 decodes and outputs the information. Thus, the user can view a navigation screen as shown in FIG. 7 as an example.

Figure 7:
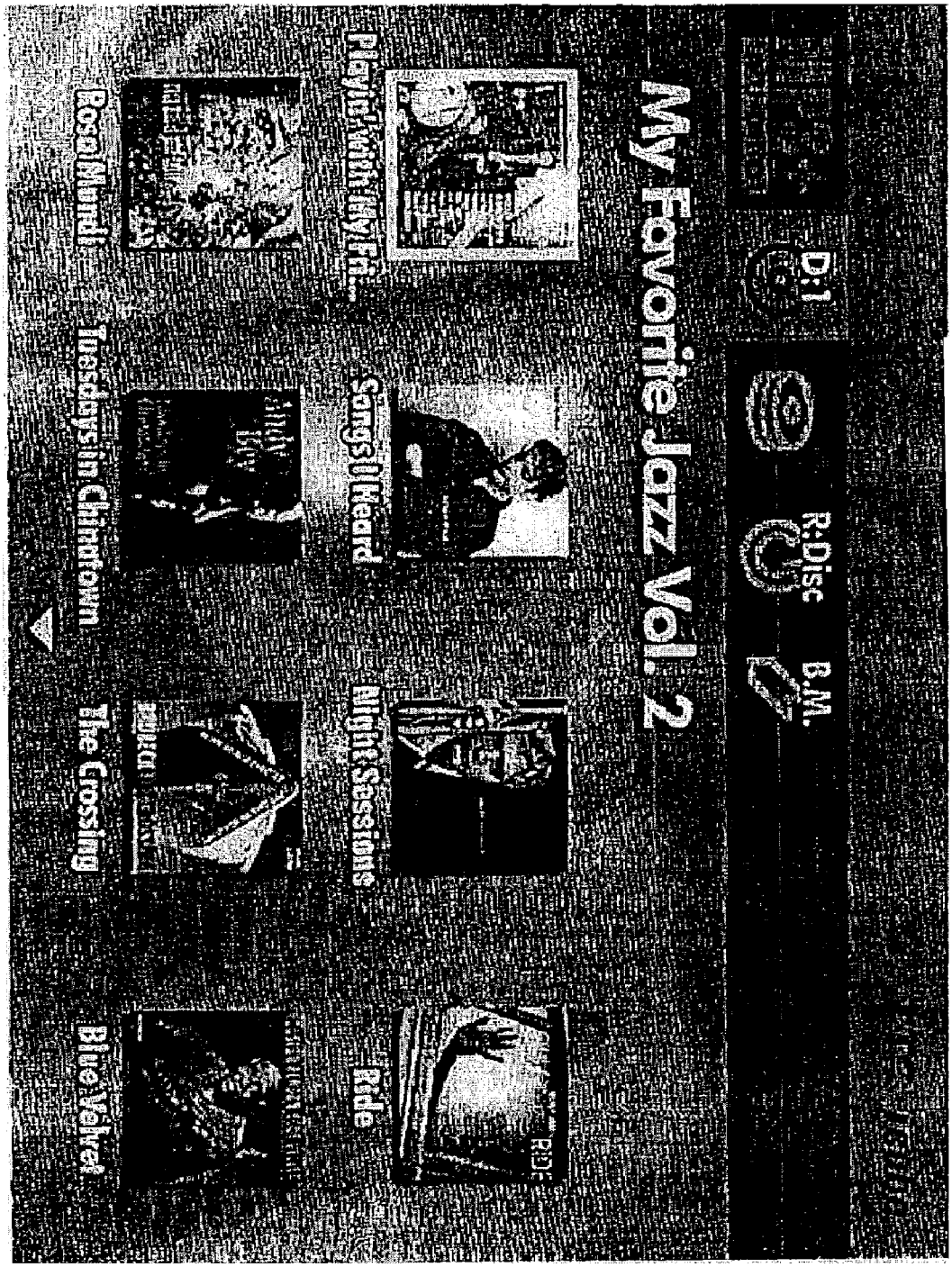
FIGS. 7, 8, 9, 10, 11, 12, 13 and 14 are views illustrating screens displayed on an audio/visual (AV) system in accordance with an embodiment of the present invention.

FIGS. 7, 8, 9, 10, 11, 12, 13 and 14 show screens displayed on the AV system in accordance with an embodiment of the present invention. Where an audio album is edited and created by the user, representative images corresponding to eight albums are synthesized on the navigation screen as shown in FIG. 7. An album title is given to each representative image. Thus, the user can intuitively recognize contents of audio contents files edited and processed by the PC 100.

If the user has selected the second album having an album title "Songs I Heard" on the navigation screen as shown in FIG. 7 at step 440, the controller 230 requests the PC 100 to reproduce data corresponding to the selected title, through the radio communicator 215 at step 460. At this time, information fed back to the PC 100 by the STB 200 can be position coordinate information of representative images configuring the navigation screen described in association with FIG. 2. Optionally, ID information of the representative images can be fed back. The PC 100 accesses file information relating to a corresponding title based on the feedback information and transmits the accessed information by radio. The STB 200 receives file information according to a reproduction request, and the received file information is stored in the memory under the control of the controller 230 at step 470.

Figure 8:
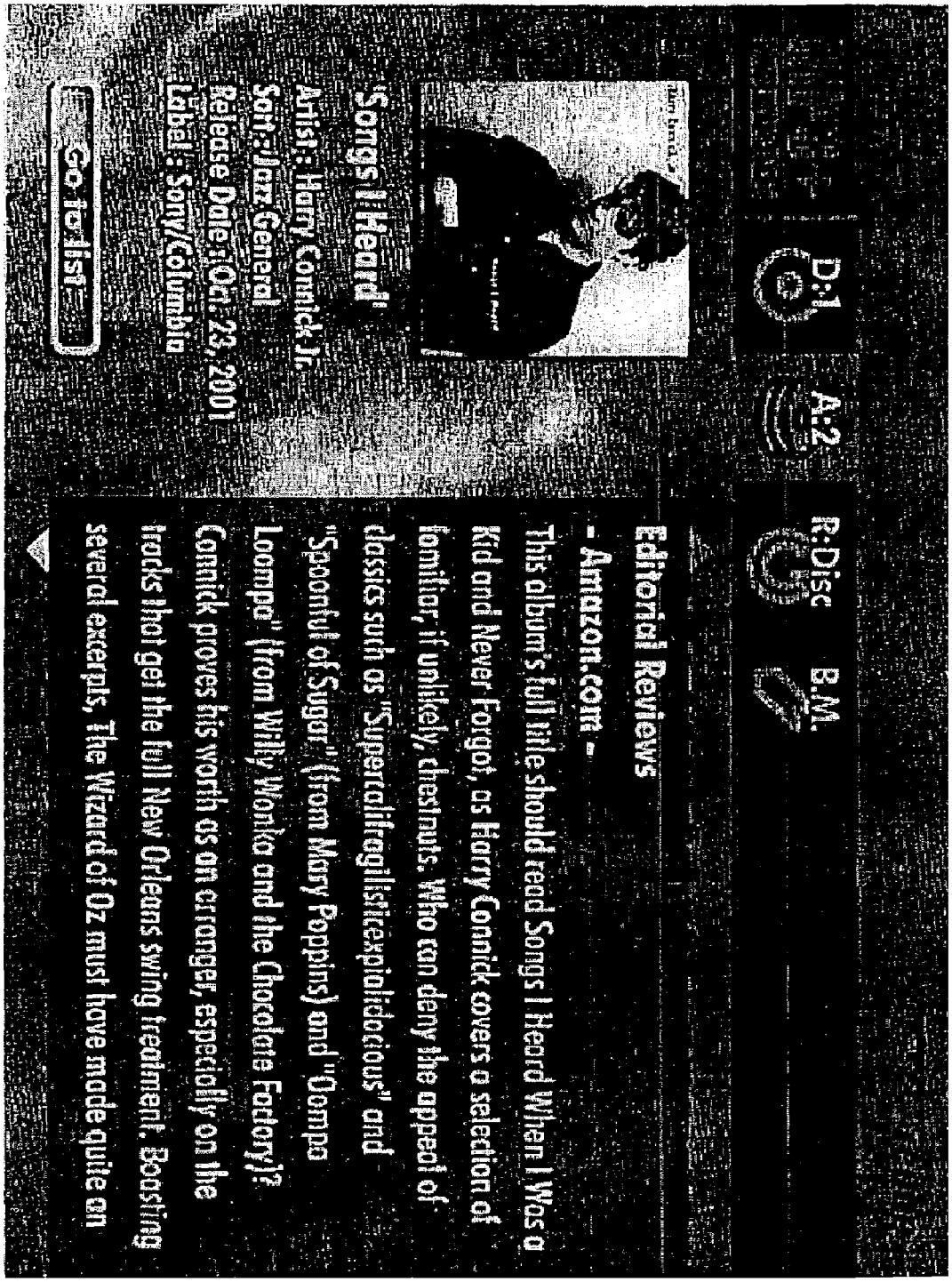
Figure 9:
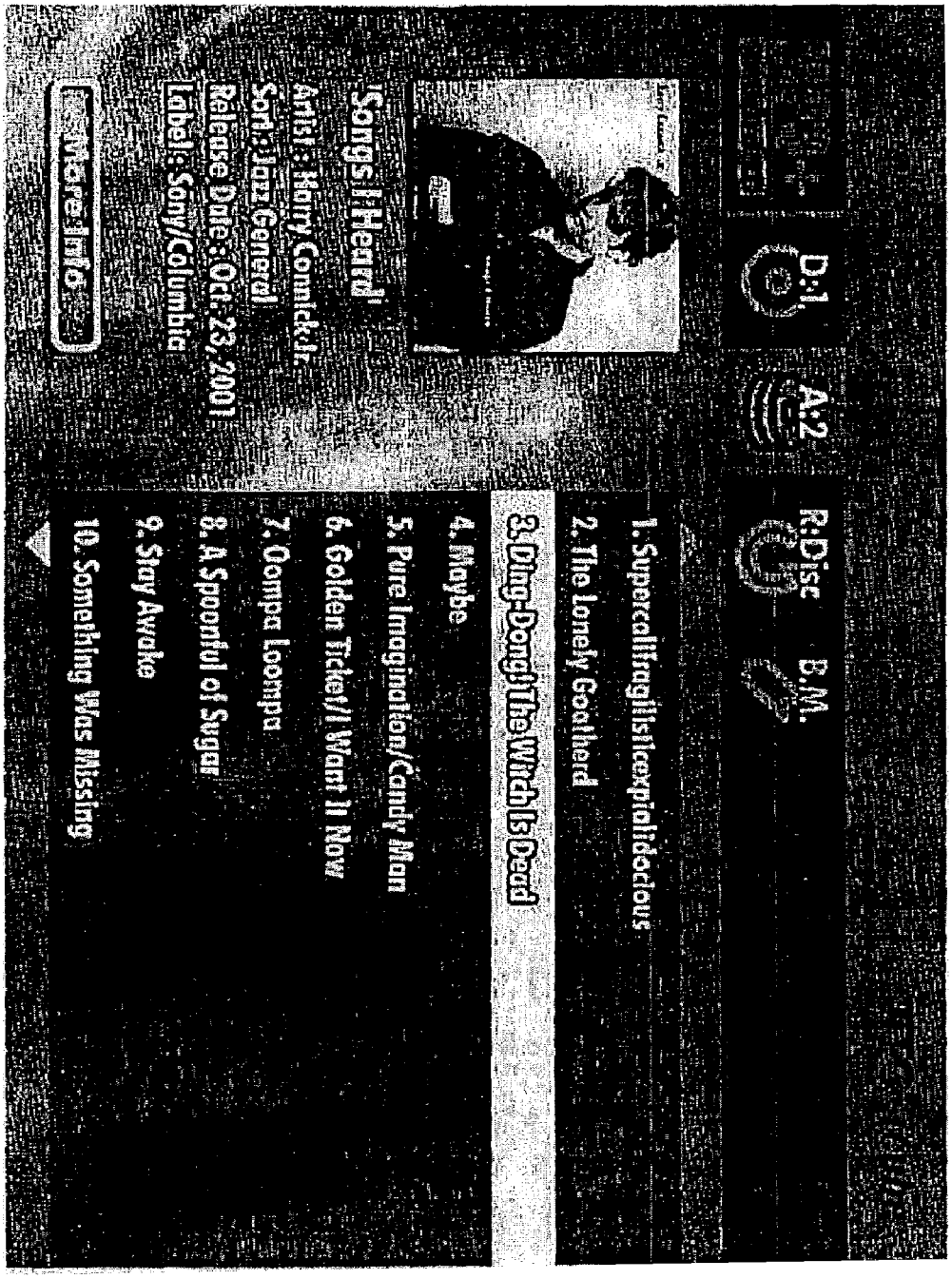

The controller 230 analyzes a header of a stored contents file to determine a type of the contents file such as a video, audio or text file. Then, the controller 230 performs a control operation so that corresponding data can be outputted to the decoder 240 or 250 or the OSD processor 245. The STB 200 decodes the stored file and outputs the decoded file at step 480. It is assumed that the navigation-screen displays audio albums, and the second album "Songs I Heard" is selected by the user. Accordingly, a subsequent screen can be displayed as shown in FIG. 8. That is, the user can view the additional information of the genre, the release date, the artist name, the label, etc. associated with the album "Songs I Heard" as shown in FIG. 8, and can receive an additional description of the album as another additional information item. Further, if the user selects a "Go to List" button to view a list of audio contents files recorded in the album, the user requests the PC 100 to access and provide the list of audio contents files at step 450. In response to the request, a list file is received from the PC 100 at the above step 470 and a decoded file is outputted at the above step 480. Then, the user can view the list of audio contents files as shown in FIG. 9. Thus, the user can hear audio corresponding to a selected audio contents file.

As shown in FIG. 9, if the user selects a specific audio contents file through a screen window to make a reproduction request, the controller 230 requests the PC 100 to access and reproduce a received file. Then, the STB 200 receives a requested audio contents file at the above step 470. Then, the STB 200 decodes the audio contents file to output the decoded audio contents file at the above step 480.

Figure 10:
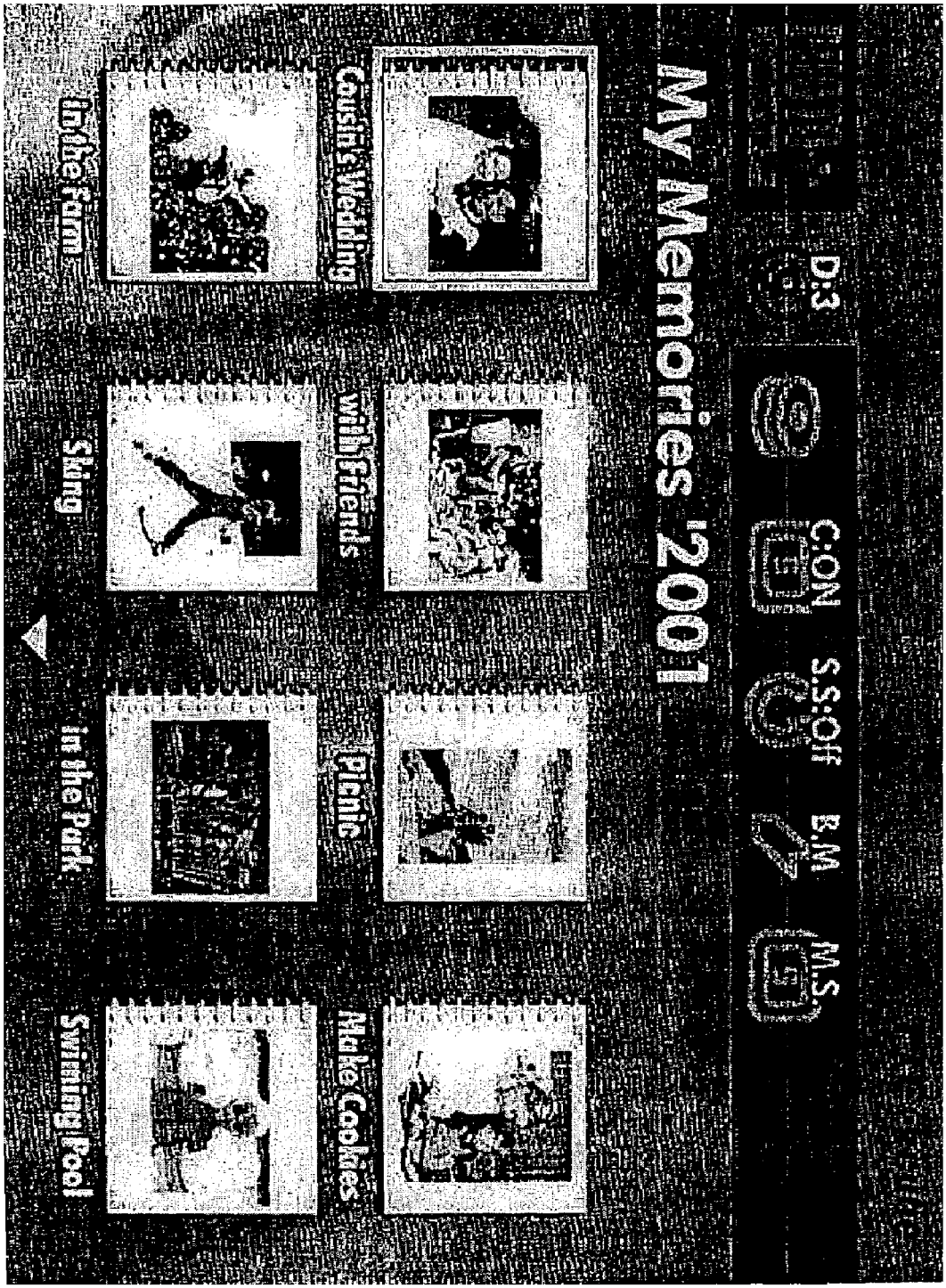
Figure 11:
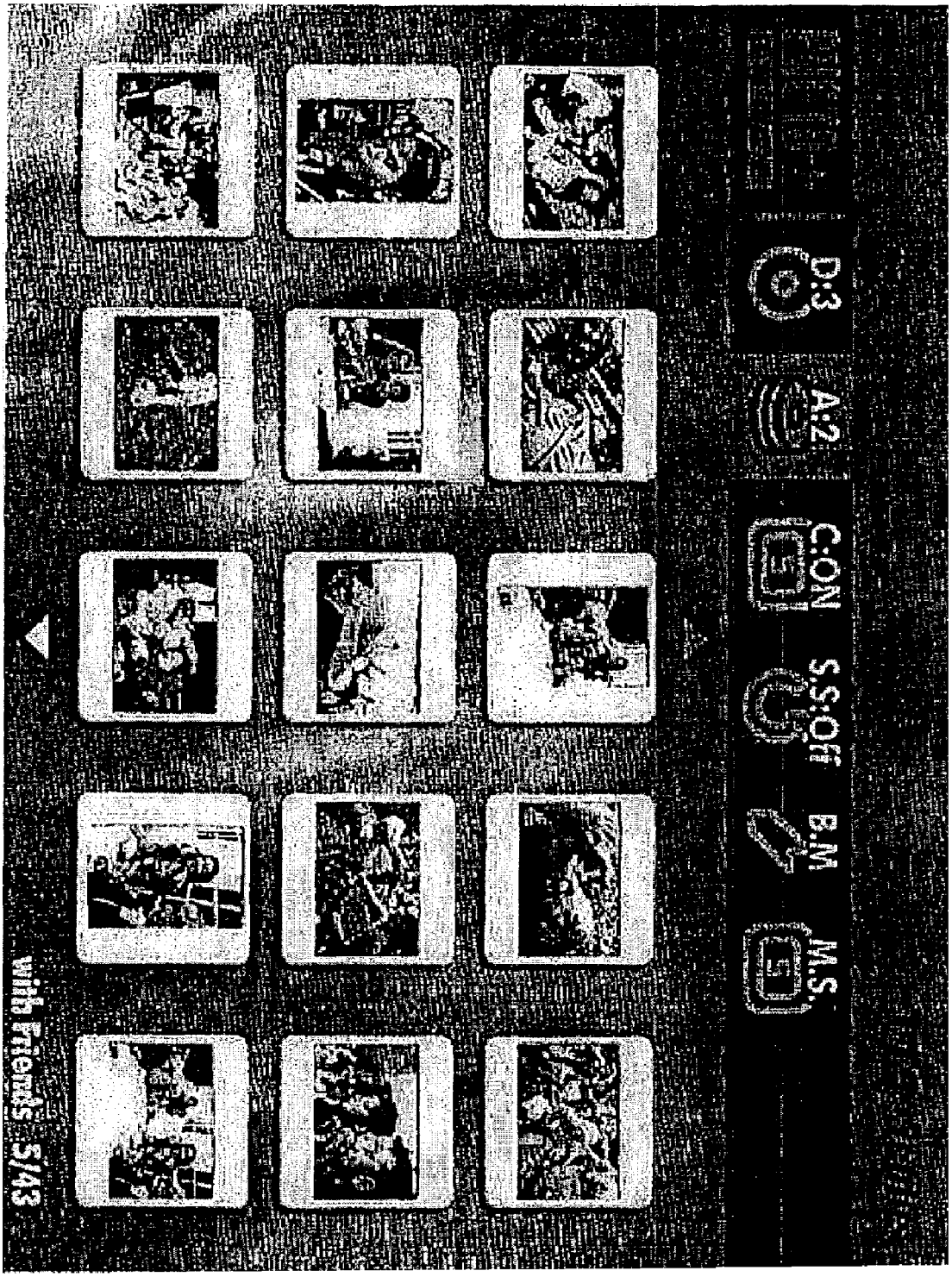
Figure 12:
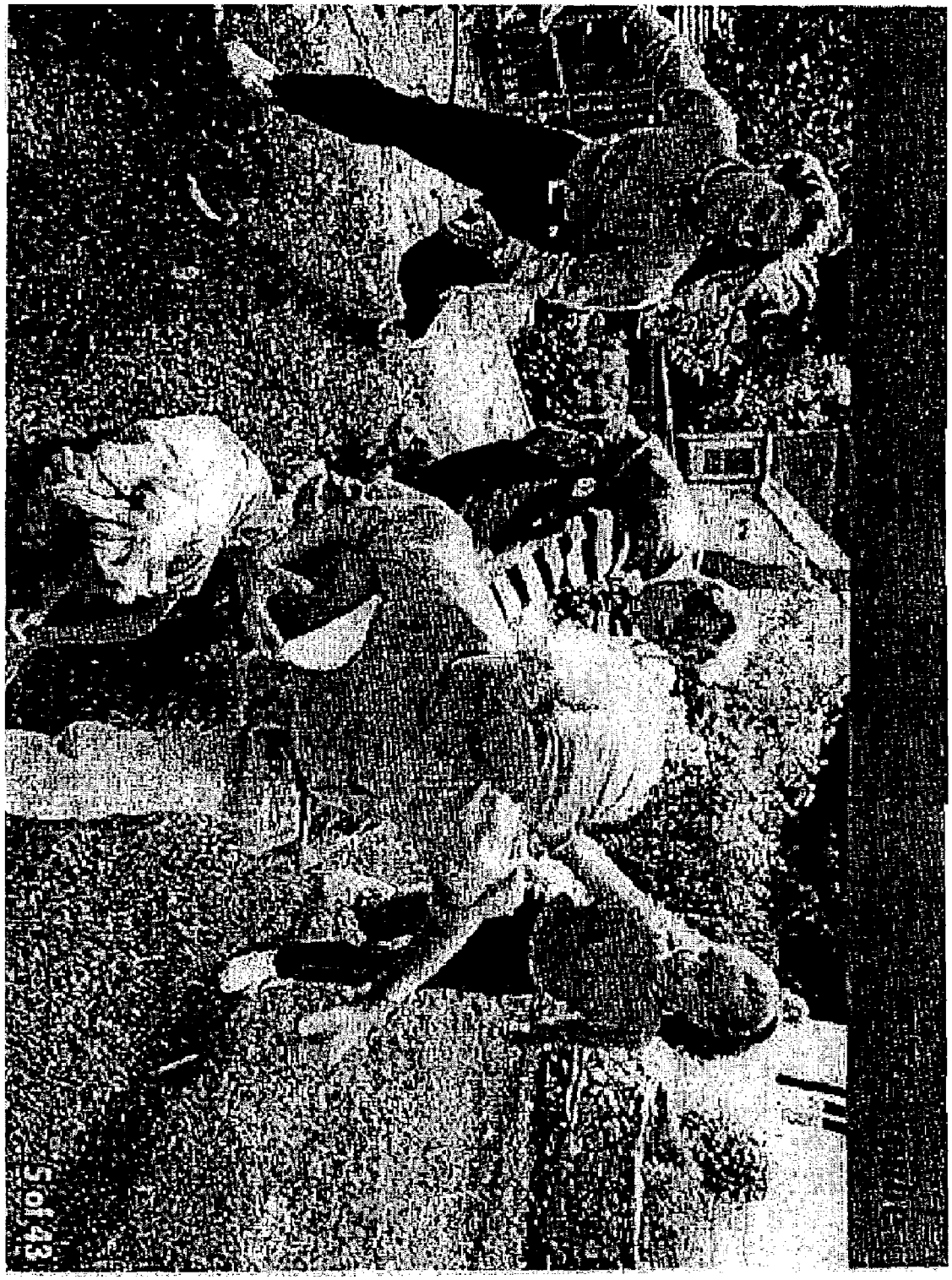

FIG. 10 shows an example of a navigation screen where a still picture indicates an album. The navigation screen includes eight album titles and their representative images. If a "with Friends" album is selected from the navigation screen at the above step 440, the STB 200 requests the PC 100 to reproduce data associated with a selected title at the above step 460. The STB 200 receives requested file information at the above step 470, and the file information decoded by the video decoder 240 is outputted at the above step 480. In this case, a plurality of image contents files recorded in the album are displayed as shown in FIG. 11. If any one of the image contents files is selected, the PC 100 sends by radio the data for a photo of an enlarged screen as shown in FIG. 12 and displays it Where a display of additional information of the selected photo is requested, the OSD processor 245 processes the additional information such as a place, date and additional description of the corresponding photo. The processed information can be overlapped on the screen. Image contents files or additional information also can be sequentially accessed in real time through data transmission requests sent by radio between the STB 200 and PC 100. Since the contents files of images such photos and the navigation screen are converted in an MPEG2 I-frame format and the converted contents files are transmitted, the images can be displayed in a true-color mode. The operation of displaying the images in the true-color mode can be performed since MPEG-2 I-frame format supports the true-color mode.

Figure 13:
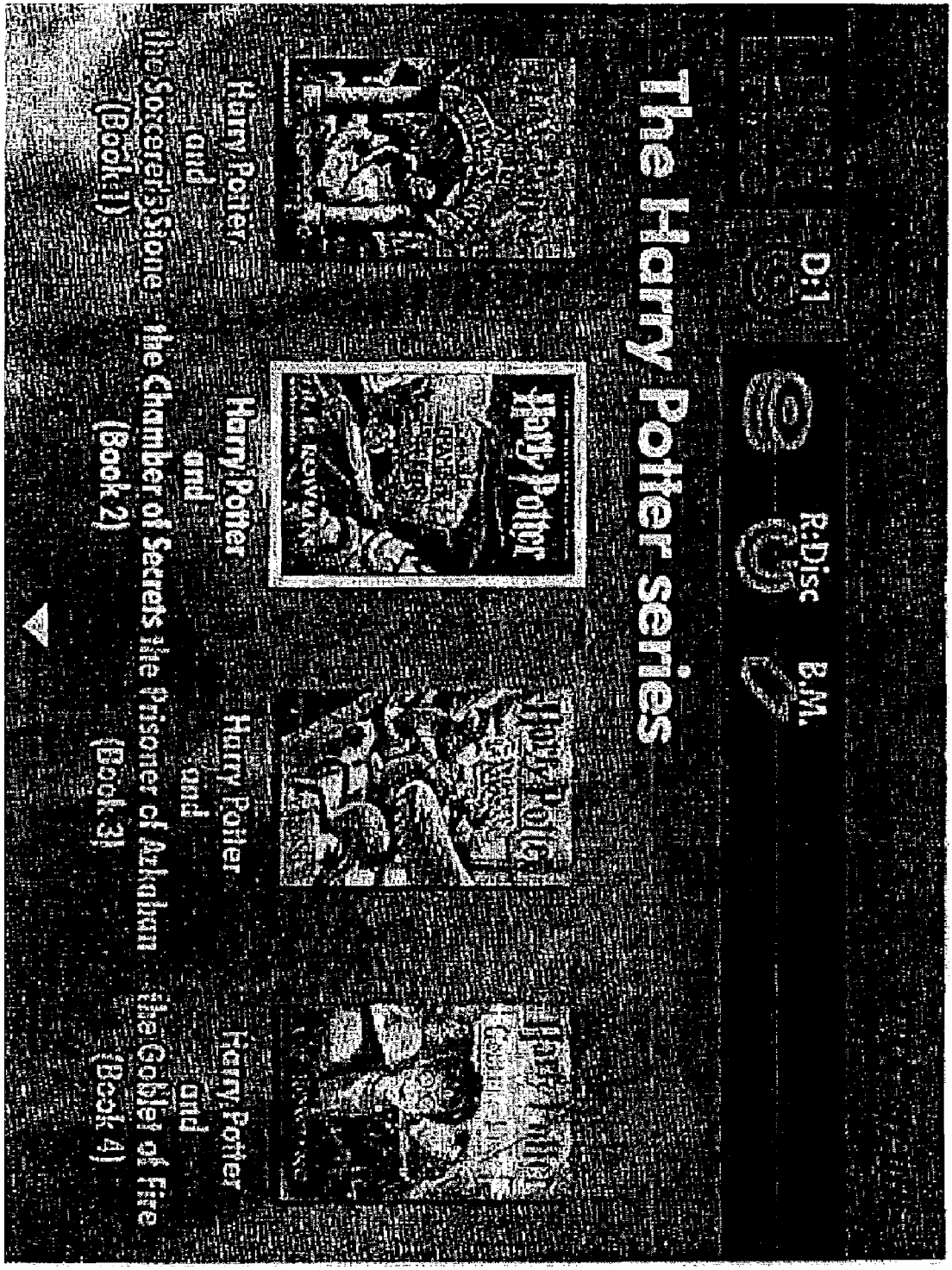
Figure 14:
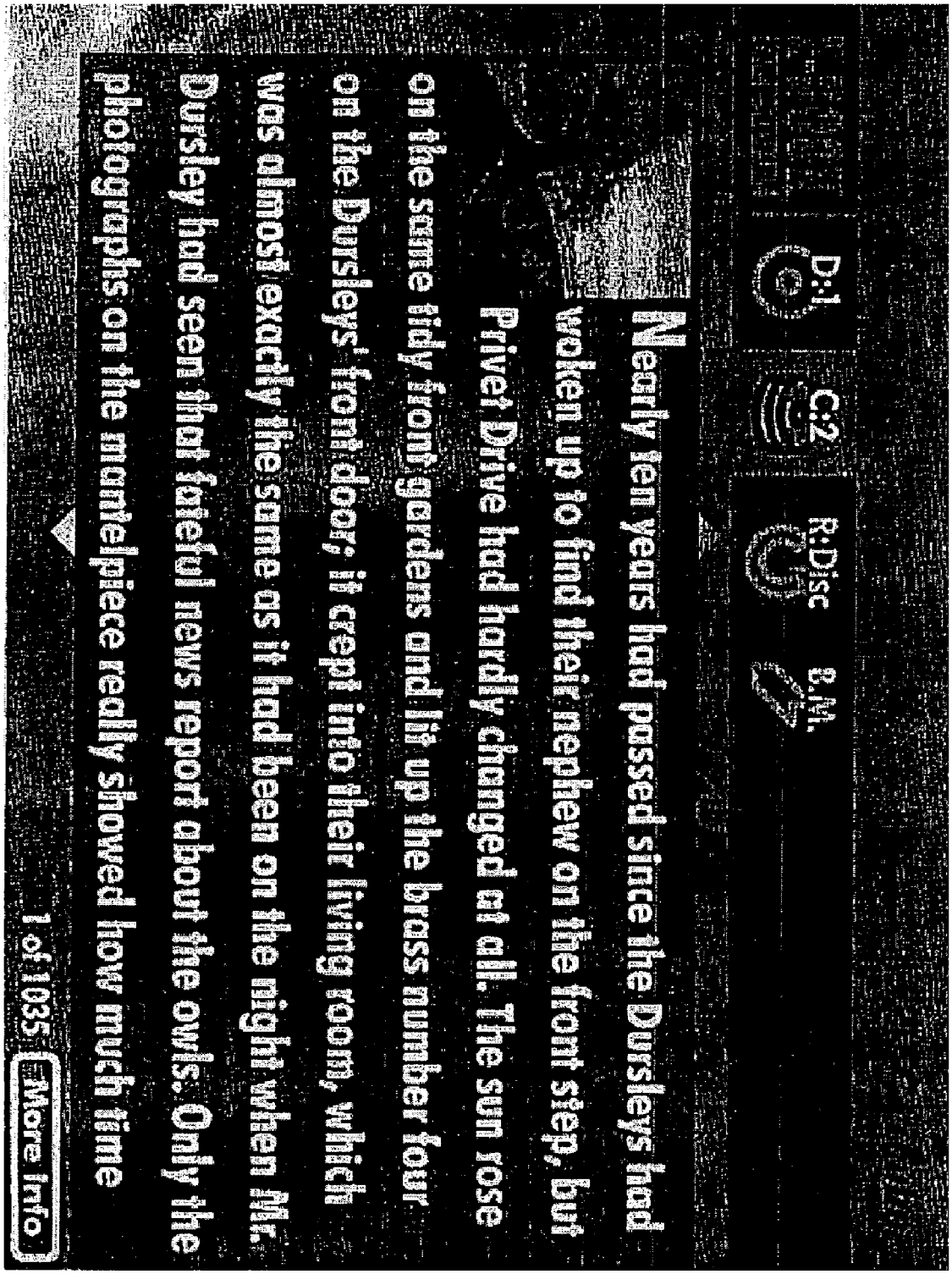

FIG. 13 shows an example of a screen where e-book files are created as albums. In FIG. 13, the screen for the text contents albums displays four representative images. If each representative image is selected, text contents associated with the selected image are reproduced and displayed as shown in FIG. 14.

In accordance with the present invention, the user of the STB 200 can easily access a corresponding contents file or its additional information, recognizing intuitively the list of contents files edited, processed and stored by the PC 100, through the easy-to-use navigation screen. Since the PC 100 converts various format-based files into files capable of being decoded by the STB 200, the STB 200 can receive all format files capable of being reproduced from the PC 100 by radio without additional hardware or software to reproduce and output the received format files.

Moreover, the present invention can not only use contents data stored in a hard disc of the PC, but also transfer, to the STB, contents provided in real time through the Internet. That is, contents streams received through an Internet interface of the PC are processed in real time and then such contents streams are transmitted to the STB by radio. Thus, the user can use an Internet radio service through the STB.

As apparent from the above description, the present invention enables a user to intuitively recognize contents files edited and processed by a server such as a personal computer, since navigation information and various formats of contents files edited and processed by the personal computer are received by radio and outputted to the user.

Further, the present invention enables an access to files of a personal computer (server) such that a user can view or hear various formats of accessed files through an audio/visual (AV) system.

Furthermore, the present invention enables high-quality images to be displayed by displaying the images of a true-color mode on an on-screen display (OSD), since a navigation screen and a contents file of images such as photos are transmitted in an MPEG2 I-frame format and the contents file is decoded based on the MPEG standard. The MPEG standard is used, because it is the mostly used format currently. The present invention is not limited to such a format. As technologies develop and new standard emerges, the present invention may adopt such new formats.

Although the embodiments of the present invention have been disclosed for illustrative purposes, those skilled in the art will appreciate that various modifications, additions and substitutions are possible, without departing from the scope of the invention. Accordingly, the present invention is not limited to the above-described embodiments, but the present invention is defined by the claims which follow, along with their full scope of equivalents.

What is claimed is:

1. A wireless receiver for receiving a multi-contents file, the wireless receiver, comprising:

a video decoder for decoding a video stream;

an audio decoder for decoding an audio contents file;

an on-screen display (OSD) processor for processing a text file and additional information;

a video output unit for selectively configuring decoded video data and text data on one screen and performing encoding and outputting operations on the basis of a format of a display unit;

an audio output unit for outputting decoded audio data;

a user interface for receiving a user's command;

a controller;

a wireless local area network (WLAN) device for transmitting data between a computer system and the controller; and a memory coupled to the controller for storing the transmitted data and a control program data, wherein the computer system comprises data, the data comprising a navigation screen, a contents file, and additional information of the contents file edited and processed by the computer system;

wherein the contents file comprises at least one of an audio contents file, a video contents file, an image contents file, and a text contents file;

wherein the controller is configured to request transmission of the data via the WLAN device from the computer system in response to the user's command, is further configured to analyze the transmitted data, and is further configured to input the analyzed data into at least one of the audio decoder, the video decoder, and the OSD processor; and wherein the additional information of the contents file comprises at least one of a representative image corresponding to each contents file and annotation information describing each contents file.

2. The wireless receiver of claim 1, wherein the user interface comprises a remote control signal receiver for receiving a signal from a remote control.

3. The wireless receiver of claim 1, wherein the data is encoded and transmitted in a MPEG2 I-frame format and decoded by at least one of the audio decoder, the video decoder, and the OSD processor.

4. A method for communicating a multi-contents file, comprising the steps of:

transmitting a user request for data from a controller to a computer system via a wireless local area network (WLAN), wherein the data comprises a navigation screen, at least one contents file, and additional information of the contents file edited and processed by the computer system;

wherein the contents file comprises at least one of an audio contents file, a video contents file, an image contents file, and a text contents file;

wherein the additional information of the contents file comprises at least one of a representative image corresponding to each contents file and annotation information describing each contents file;

receiving the transmitted data from the computer system via the WLAN;

decoding the transmitted data;

outputting the decoded data to an audio/visual system;

transmitting a subsequent user request for subsequent data from the controller to the computer system via the WLAN, wherein the subsequent data comprises at least one of a navigation screen, at least one contents file, a file of list information corresponding to each title configure the navigation screen, and additional information for the at least one contents file edited and processed by the computer system;

performing a decoding or on-screen display (OSD) processing operation for the transmitted subsequent data; and outputting the decoded or processed data to the audio/visual system.

5. The method of claim 4, further comprising the steps of:

encoding and transmitting the data in a MPEG2 I-frame format; and decoding the data with at least one of the audio decoder, the video decoder, and the OSD processor.

*6. A wireless receiver for receiving a multi-contents file, the wireless receiver, comprising:*

*a video decoder for decoding a video stream;*

*an audio decoder for decoding an audio contents file;*

*an on-screen display (OSD) processor for processing a text file and additional information;*

*a video output unit for selectively configuring decoded video data and text data on one screen and performing encoding and outputting operations on the basis of a format of a display unit;*

*an audio output unit for outputting decoded audio data;*

*a user interface for receiving a user's command;*

*a controller;*

*a communication device for transmitting data between a media system and the controller; and*

*a memory coupled to the controller for storing the transmitted data and a control program data,*

*wherein the media system comprises data, the data comprising a navigation screen, a contents file, and additional information of the contents file edited and processed by the media system;*

*wherein the contents file comprises at least one of an audio contents file, a video contents file, an image contents file, and a text contents file;*

*wherein the controller is configured to request transmission of the data via the communication device from the media system in response to the user's command, is further configured to analyze the transmitted data, and is further configured to input the analyzed data into at least one of the audio decoder, the video decoder, and the OSD processor; and*

*wherein the additional information of the contents file comprises at least one of a representative image corresponding to each contents file and annotation information describing each contents file.*

*7. The wireless receiver of claim 6, wherein the user interface comprises a remote control signal receiver for receiving a signal from a remote control.*

*8. The wireless receiver of claim 6, wherein the data is encoded and transmitted in a MPEG2 I-frame format and decoded by at least one of the audio decoder, the video decoder, and the OSD processor.*

*9. A method for communicating a multi-contents file, comprising the steps of:*

*transmitting a user request for data from a controller to a media system via a wireless local area network (WLAN), wherein the data comprises a navigation screen, at least one contents file, and additional information of the contents file edited and processed by the media system;*

*wherein the contents file comprises at least one of an audio contents file, a video contents file, an image contents file, and a text contents file;*

*wherein the additional information of the contents file comprises at least one of a representative image corresponding to each contents file and annotation information describing each contents file;*

*receiving the transmitted data from the media system via the WLAN;*

*decoding the transmitted data;*

*outputting the decoded data to an audio/visual system;*

*transmitting a subsequent user request for subsequent data from the controller to the media system via the WLAN, wherein the subsequent data comprises at least one of a navigation screen, at least one contents file, a file of list information corresponding to each title configure the navigation screen, and additional information for the at least one contents file edited and processed by the media system;*

*performing a decoding or on-screen display (OSD) processing operation for the transmitted subsequent data; and*

*outputting the decoded or processed data to the audio/visual system.*

*10. The method of claim 9, further comprising the steps of:*

*encoding and transmitting the data in a MPEG2 I-frame format; and*

*decoding the data with at least one of the audio decoder, the video decoder, and the OSD processor.*

* * * * *